United States Patent Office

2,907,760
Patented Oct. 6, 1959

2,907,760

BIS-4.5-NAPHTHYLENE-1.2.3-TRIAZOLYL-(2)-STILBENE COMPOUNDS

Reinhard Zweidler, Basel, and Ernst Keller, Binningen, Basel Land, Switzerland, assignors to J. R. Geigy A.-G., Basel, Switzerland No Drawing. Application August 19, 1957
Serial No. 679,072

Claims priority, application Switzerland August 24, 1956

6 Claims. (Cl. 260—240)

The invention concerns optical brightening agents which compensate the yellowish colour of more or less white carriers in daylight by converting the ultra violet light contained therein into blue fluorescence light.

It is known that certain 4.5-arylene-1.2.3-triazolyl-(2)-stilbene compounds are valuble optical brightening agents. The use of 4.4'-bis-(4.5-naphthylene-1.2.3-triazolyl-(2)-stilbene compounds for the brightening of yellowed cellulose fibres has already been suggested. These symmetrical 4.4'-bis-triazolyl stilbene compounds have the disadvantage however, of having, in practice, an undesirable too green fluorescence light which limits their use to the shading of blue fluorescing brightening agents. Also, because of a relatively strong self colour, their maximal brightening effect on textiles is slight.

It has now been found that very valuable optical brightening agents are obtained if 1 mol of 4.3'-diaminostilbene-2-sulphonic acid is tetrazotised and the tetrazo compound is coupled with 2 mols of the same or different aminonaphthalene sulphonic acids coupling in the neighbouring position to the amino group, and the di-o-aminoazo dyestuff obtained is oxidised to form the 4.3'-bis-[sulphonaphtho-(1.2)-triazolyl]-stilbene-2-sulphonic acid.

Examples of coupling components are 2-aminonaphthalene-5-, -6-, or -7-sulphonic acid and 1-aminonaphthalene-4-sulphonic acid.

The stilbene compounds which can be used as starting materials can be obtained for example according to Thiele's method by condensing aromatic nitro or acyl-amino aldehydes with suitably substituted p-nitrotoluenes. To produce the stilbene-2-sulphonic acid derivatives advantageously the method according to patent specification No. 2,657,228 is used.

The alkali salts of the compounds obtained according to the present invention which, in the free form, correspond to the general formula:

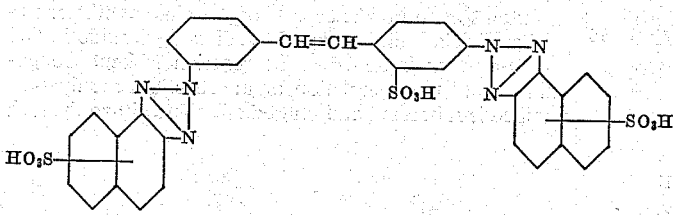

for example, the lithium, sodium, potassium and ammonium salts, are suitable for the brightening of white textiles and linen made up from cellulose fibres because of their good substantivity in aqueous solution, in particular in washing liquors, possibly also however, in rinsing liquors, discharging and reserve printing pastes and in starch pastes. They can be mixed with advantage in amounts of 0.001 to 1.0% in the usual household soaps and synthetic washing agents. The new unsymmetrical compounds have more pure white shades and a better maximal brightening effect on cellulose fibres than comparable known symmetrical bis-(4.5-arylene-1.2.3-triazolyl-2)-stilbene compounds; compared with unsymmetrical monoarylene triazolyl stilbene compounds, they are distinguished by better fastness to washing on cellulose fibres.

The following examples serve to illustrate the invention; where not otherwise expressly stated, parts are given as parts by weight. The temperatures are in degrees centigrade. The relationship of parts by weight to parts by volume is as that of grammes to millilitres.

Example 1

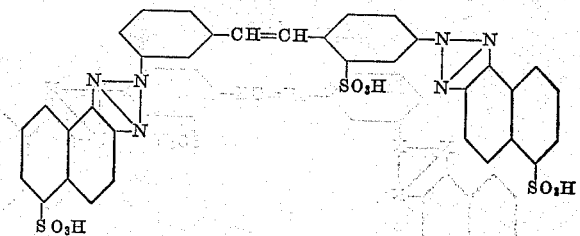

29.0 parts of 4.3'-diaminostilbene-2-sulphonic acid are dissolved with 4.1 parts of sodium hydroxide in 300 parts of hot water, an aqueous solution of 13.8 parts of sodium nitrite is added whereupon the whole is indirectly tetrazotised at a temperature of 6–8° with 50 parts of concentrated hydrochloric acid. It is stirred for 1 hour and then the suspension of the tetrazo compound is added to a solution of 44.6 parts of 2-aminonaphthalene-5-sulphonic acid, 8.2 parts of sodium hydroxide and 50 parts of crystallized sodium acetate in 500 parts of water. On completion of the coupling, the di-o-aminoazo dyestuff is completely precipitated by the addition of sodium chloride and filtered off. The damp dyestuff is then dissolved completely in water of a temperature of 92–97° with the addition of 40 parts of 25% ammonia and a mixture of 120 parts of crystallized copper sulphate in 480 parts of water and 240 parts of 25% ammonia is added. It is kept at a temperature of 95–97° until the starting dyestuff has completely disappeared, then allowed to cool and the bis-triazole compound is completely precipitated out by the addition of sodium chloride. It is filtered off at room temperature and washed with ammoniacal salt solution until the filtrate is colourless. The crude product is then dissolved in hot water in the presence of excess sodium sulphide, the copper sulphide formed is filtered off and the product is purified by dissolving with the addition of 3–6 parts of sodium hydrosulphite and animal charcoal and crystallising. The trisodium salt of 4.3'-bis-naphthotriazolyl stilbene trisulphonic acid of the above formula is obtained as a yellowish substance. The same substance is also obtained if the di-o-aminoazo dyestuff is oxidised in the manner described in example 2 with sodium hypochlorite to form the bis-triazole. The compound named is a valuable brightening agent for cellulose fibres and linear polyamide fibres such as nylon and perlon. It has an increased drawing power from non-ionogenic washing agents. On the textile fibres brightened therewith it has good fastness to washing, excellent fastness to chlorine and good fastness to light.

A product having similar properties is obtained if in the above example the 2-aminonaphthalene-5-sulphonic acid is replaced by 44.6 parts of 1-aminonaphthalene-4-sulfonic acid. The corresponding 4.3′-bis-[4-sulphonaphtho-(1.2)-triazolyl]-stilbene-2-sulphonic acid is obtained by oxidising the di-o-aminoazo dyestuff. It is obtained in the form of the trisodium salt. The 4.3′-diaminostilbene-2-sulphonic acid used in the above example is obtained by condensing 151 parts of m-nitrobenzaldehyde and 293 parts of 1-methyl-4-nitrobenzene-2-sulphonic acid phenyl ester in the presence of pyridine, then saponifying the 4.3′-dinitrostilbene sulphonic acid phenyl ester (M.P. 147–149°) to form 4.3′-dinitrostilbene-2-sulphonic acid and then reducing the nitro to amino groups according to Béchamp by means of etched cast iron fillings. It is obtained in the form of a yellowish powder.

Example 2

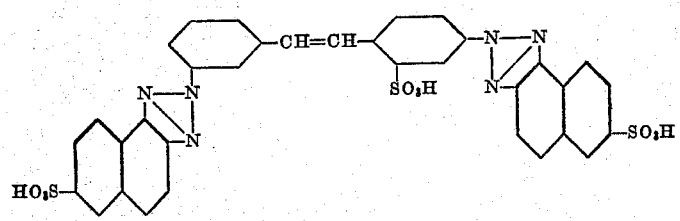

29.0 parts of 4.3′-diaminostilbene-2-sulphonic acid are indirectly diazotised as described in Example 1 and the tetrazo compound is coupled with a solution of 44.6 parts of 2-aminonaphthalene-6-sulphonic acid, 8.2 parts of sodium hydroxide and 50 parts of crystallized sodium acetate in 800 parts of water. On completion of the coupling, the dyestuff is completely salted out and isolated. The damp di-o-aminoazo dyestuff with the addition of 12 parts of sodium hydroxide is then dissolved in hot water, the solution is cooled to room temperature and the suspension obtained with the addition of 240 parts of an aqueous sodium hypochlorite solution (about 17%) is stirred for some hours. On completion of the oxidation, the temperature is raised to 80–85°, the bistriazole obtained is precipitated by the addition of sodium chloride and isolated at room temperature. The crude product is then further purified by dissolving and allowing to crystallise from hot water with the addition of 3–6 parts of sodium hydro-sulphite and animal charcoal. After drying, the trisodium salt of 4.3′ - bis - [6 - sulphonaphtho - (1.2) - triazolyl] - stilbene-2-sulphonic acid is obtained in the form of a yellowish powder. The same substance is also obtained if the di-o-aminoazo dyestuff is oxidised according to the method described in Example 1 with ammonia and copper sulphate to form the bis-triazole. This compound is a valuable brightening agent for cellulosce fibres and for linear polyamide fibres such as nylon etc. The fibres treated therewith are pleasantly shaded white, which shading has good fastness properties in particular an excellent fastness to chlorine, very good fastness to washing and good fastness to light.

Example 3

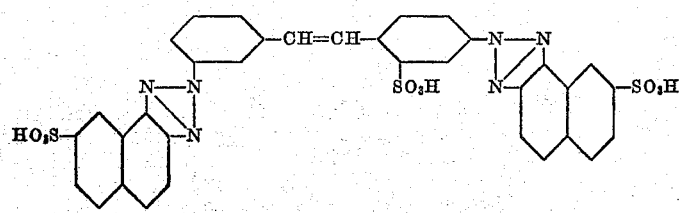

A tetrazo suspension prepared according to Example 1 from 29.0 parts of 4.3′-diaminostilbene-2-sulphonic acid is coupled at 8–10° with an aqueous solution of 44.6 parts of 2-aminonaphthalene-7-sulphonic acid, 8.2 parts of sodium hydroxide and 50 parts of crystallised sodium acetate, and the components are stirred until the coupling is complete. After the addition of sodium chloride, the dyestuff obtained is isolated, dissolved in 40 parts of aqueous ammonia (about 25%) in hot water and oxidised by the process described in Example 1 with a mixture of 120 parts of crystallised copper sulphate in 480 parts of water and 240 parts of ammonia (about 25%) to form the bis-triazolyl compound. After dissolving and allowing to crystallise, the trisodium salt of 4.3′-bis - [7 - sulphonaphtho - (1.2) - triazolyl] - stilbene - 2-sulphonic acid is obtained as a yellowish powder. The same substance is also obtained if the di-o-aminoazo dyestuff is oxidised with 240 parts of 17% aqueous sodium hypochlorite solution as described in Example 2, to form the bis-triazole. This product is a valuable brightening agent for cellulose fibres, linear polyamide fibres such as nylon or perlon. The brightening effects obtained with this compound are distinguished by excellent fastness to chlorine and very good fastness to washing and light.

Example 4

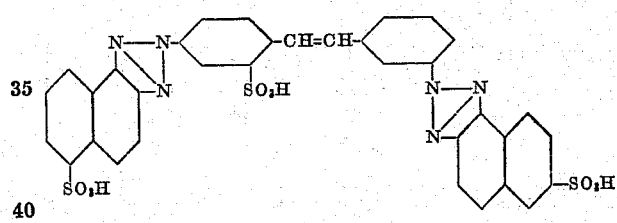

29.0 parts of 4.3′-diaminostilbene-2-sulphonic acid with 4.1 parts of sodium hydroxide are dissolved warm in 300 parts of water, an aqueous solution of 13.8 parts of sodium nitrite is added and the whole is indirectly tetrazotised at 6–8° with 51 parts of concentrated hydrochloric acid with the addition of ice. The suspension of the tetrazo compound is stirred for 1 hour and then poured into a solution of 22.3 parts of 2-aminonaphthalene-5-sulphonic acid and 4.1 parts of sodium hydroxide in 500 parts of water. The strong Congo-blue reaction of the mixture is made Congo-violet to Congo-neutral by the gradual addition of an aqueous solution of 50 parts of crystallised sodium acetate and, after the coupling component has disappeared, a solution of 22.3 parts of 2-aminonaphthalene-6-sulphonic acid and 4.1 parts of sodium hydroxide in 500 parts of water is added. The reaction is kept Congo-neutral until the completion of the reaction, the dyestuff obtained is salted out and filtered off. The disazo dyestuff is then completely dissolved in water at a temperature of 92–97° with the addition of 40 parts of ammonia (about 25%) and a mixture of 120 parts of crystallised copper sulphate in 480 parts of water and 240 parts of ammonia (about 25%) is added. The temperature is kept at 95–97° until the dyestuff is completely oxidised. The mixture is cooled and the crude bis-triazole compound is precipitated by the addition of sodium chloride. It is filtered off and the residue is washed with ammoniacal sodium chloride solution until the filtrate runs clear. The crude product is dissolved in hot water in the presence of excess sodium sulphide, the copper sulphide formed is filtered off and the dissolved product is further purified at about 90° by the addition of 3–6 parts of sodium hydrosulphite and animal charcoal. After salting out, filtering off and drying, the trisodium salt of 4.3'-bis-naphthotriazolyl-stilbene trisulphonic acid, which possibly corresponds to the above formula, is obtained as a yellowish powder.

This compound is a valuable brightening agent for cellulose fibres and linear polyamide fibres such as nylon and perlon. The brightening effects attained therewith are distinguished by excellent fastness to chlorine, very good fastness to washing and light.

A similar product is obtained if in the above example the 22.3 parts of 2-aminonaphthalene-6-sulphonic acid are replaced by the same number of parts of 2-aminonaphthalene-7-sulphonic acid. In this case a compound of the probable formula:

is obtained as a yellowish powder.

*Example 5*

White cotton poplin is treated with 0.05% (calculated on the weight of the fibres) of the trisodium salt of 4.3' - bis - [(5' - sulphonaphtho - 1'.2':4.5) - 1.2.3 - triazolyl-2]-stilbene-2-sulphonic acid obtained according to Example 1. The treatment is performed in the presence of 5% of Glauber's salt (calculated on the weight of the fibres) for 15 minutes at 40–42° in a bath, the liquor ratio of which is 1:30. After rinsing and drying, the material so treated has a considerably more white appearance than before the treatment.

*Example 6*

1 part of household washing, such as, e.g. pillow cases, sheets etc. is washed in the usual way at 90–100° in 10 parts of a washing liquor containing 3 g. of grain soap, 2.0 g. of soda and 0.004 g. of the trisodium salt of 4.3'-bis-[(5' - sulphonaphto - 1'.2':4.5) - 1.2.3 - triazolyl - 2]-stilbene-2-sulphonic acid obtained according to Example 1, per litre. The goods are then rinsed and dried. A dazzling white wash is obtained which has no unpleasant reddish tinge.

*Example 7*

10 parts of pale yellowish nylon material is dyed for 30 minutes at 85–90° in a dyebath containing 0.02 part of the trisodium salt of 4.3'-bis-[(5'-sulphonaphtho-1'.2':4.5)-1.2.3-triazolyl-2]-stilbene-2-sulphonic acid obtained according to Example 1 and 0.2 part of formic acid (liquor ratio 1:40). The goods are rinsed in cold water and dried in the air. In daylight the material so treated has a much whiter appearance than untreated material.

What we claim is:

1. A stilbene compound of the general formula:

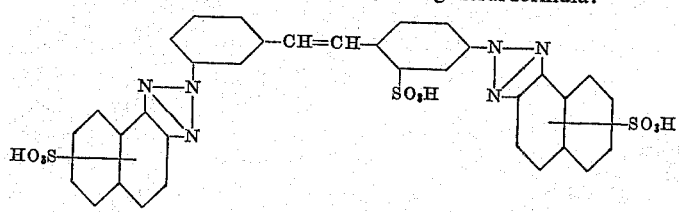

2. A stilbene compound of the formula:

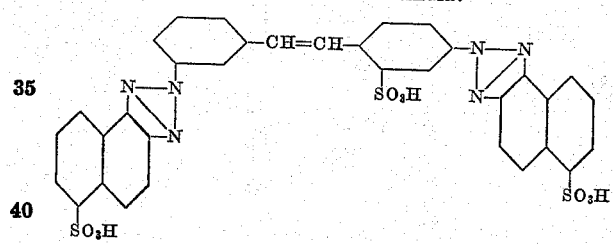

3. A stilbene compound of the formula:

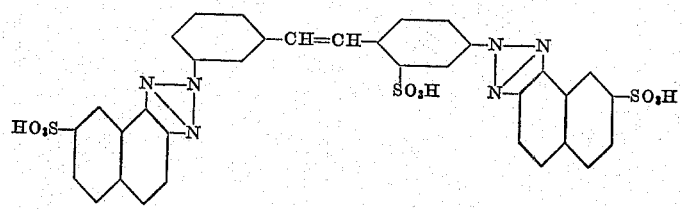

4. A stilbene compound of the formula:

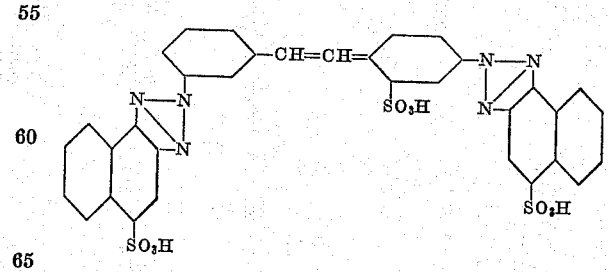

5. A stilbene compound of the formula:

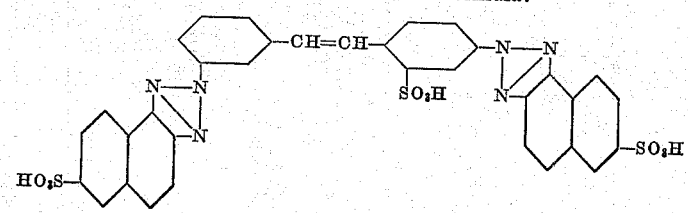

6. A stilbene compound of the formula:
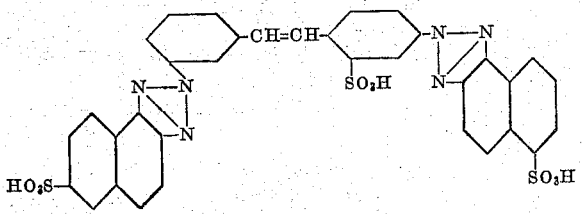
References Cited in the file of this patent
UNITED STATES PATENTS
| | | |
|---|---|---|
| 2,784,183 | Keller | Mar. 5, 1957 |
| 2,784,184 | Zweidler | Mar. 5, 1957 |